United States Patent Office 2,716,104
Patented Aug. 23, 1955

2,716,104

MULTICOMPONENT INTERPOLYMERS OF VINYLIDENE CYANIDE

Harry Gilbert, Cuyahoga Falls, and Floyd F. Miller, Wadsworth, Ohio, assignors to The B. F. Goodrich Company, New York, N. Y., a corporation of New York No Drawing. Application January 26, 1952, Serial No. 268,461

13 Claims. (Cl. 260—78.5)

This invention relates to novel multicomponent polymers and methods for the preparation thereof, and pertains more particularly to interpolymers of vinylidene cyanide with two or more conjugated aliphatic dienes, which interpolymers are extremely valuable synthetic resins, being especially useful in the preparation of filaments, films and the like.

Monomeric vinylidene cyanide is a clear liquid at room temperature and a crystalline solid at 0° C. It melts in the range of 6.0° C. to 9.7° C. depending on purity, with purest samples melting at 9.0° C. to 9.7° C., and it boils at 40° C. at a reduced pressure of 5 mm. of mercury. The monomer is quite sensitive to water, undergoing on contact therewith at room temperature an instantaneous homopolymerization reaction to give a solid, water insoluble resin. Methods for the preparation of monomeric vinylidene cyanide are disclosed in U. S. Patents 2,476,270, 2,502,412 and 2,514,387.

In copending applications, Serial Nos. 159,146 and 159,147, filed April 29, 1950, it is disclosed that monomeric vinylidene cyanide possessing the above properties polymerizes readily with aliphatic conjugated dienes to give hard, horny, resinous, non-rubbery two component copolymers. Such copolymers are further unique in that they are essentially 1:1 alternating copolymers, that is, copolymers possessing the structure:

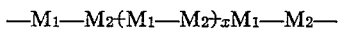

wherein each $M_1$ is a vinylidene cyanide unit

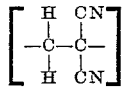

each $M_2$ is a unit of an aliphatic conjugated diene, and $x$ is a polydigit number. The fact that the copolymers thus obtained are essentially 1:1 alternating copolymers is determined by nitrogen analysis of the copolymer which shows that the two monomers enter the polymer chain in essentially equimolar ratios regardless of the degree of monomer to polymer conversion and of charging ratio. Further supporting evidence for this fact is found in the copolymerization equation of F. M. Lewis, C. Walling et al., Journal of the American Chemical Society, volume 70, page 1519 (1948):

$$\frac{d[M_1]}{d[M_2]} = \frac{[M_1]}{[M_2]} \cdot \frac{r_1[M_1]+[M_2]}{r_2[M_2]+[M_1]}$$

wherein:

$M_1$=concentration of unreacted monomer $M_1$
$M_2$=concentration of unreacted monomer $M_2$
$r_1$=ratio of the rate constants for the reaction of an $M_1$ type radical with $M_1$ and $M_2$ respectively
$r_2$=ratio of the rate constant for the reaction of an $M_2$ type radical with $M_2$ and $M_1$ respectively When the product of $r_1$ and $r_2$ (values of $r_1$ and $r_2$ being determined by solving the equation for $r_1$ and $r_2$) is equivalent to 0, a 1:1 alternating copolymer is formed, that is, a copolymer having the

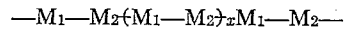

structure shown hereinabove. It has been found that the product of $r_1$ and $r_2$ as calculated for two component copolymers of vinylidene cyanide with aliphatic conjugated dienes is substantially 0, so that the equation clearly indicates that an essentially 1:1 alternating copolymer is formed.

However, while useful filaments, films and other shaped articles can be prepared from copolymers of vinylidene cyanide with aliphatic conjugated dienes, said copolymers possess several undesirable properties. For example, two component copolymers of vinylidene cyanide with dienes generally are very high melting and have a relatively short melt life, so that difficulty is encountered in fabricating such copolymers into filaments, films and the like. Also, such copolymers are insoluble in most solvents ordinarily utilized in preparing polymer solutions.

Accordingly, it is an object of the present invention to modify the properties obtained in two component copolymers of vinylidene cyanide and dienes so that the resulting materials may be easily fabricated into filaments, films and other shaped articles.

Another object of this invention is to provide interpolymers containing vinylidene cyanide and at least two aliphatic conjugated dienes, which interpolymers can be readily melt spun, cast or molded.

It is another object of this invention to polymerize vinylidene cyanide with two or more aliphatic conjugated dienes to give interpolymers which possess a lower melting point and a longer melt life than do two component copolymers of vinylidene cyanide with conjugated aliphatic dienes.

It is still another object of this invention to polymerize vinylidene cyanide with two or more aliphatic conjugated dienes in order to obtain interpolymers which are soluble in common solvents. Other objects will be apparent from the description which follows.

It has now been discovered that the above and other objects are readily accomplished by polymerizing vinylidene cyanide with at least two aliphatic conjugated dienes. Interpolymers obtained in this manner possess lower melting points and longer melt life than two component copolymers of vinylidene cyanide with dienes and additionally are soluble in a large number of solvents commonly utilized with polymeric materials. Accordingly, such interpolymers are extremely valuable materials in that they can be either melt or solvent spun into filaments which possess many useful properties, including high tensile strength and resistance to the action of alkalis, acids and the weather.

Among the conjugated aliphatic dienes which may be polymerized with vinylidene cyanide to form the interpolymers of this invention are included for example, butadiene-1,3, 2-methyl butadiene-1,3, piperylene, 2,3-dimethyl butadiene-1,3, 1,2-dimethyl butadiene-1,3, 1,3-dimethyl butadiene-1,3, 1-ethyl butadiene-1,3, 1,4-dimethyl butadiene - 1,3, 2 - neopentyl butadiene - 1,3, 2 - methyl pentadiene - 1,3, 1 - phenyl butadiene - 1,3, 2-chloro-butadiene-1,3, 2-bromo-butadiene-1,3, 2-iodo-butadiene-1,3, 2-chloro-3-methyl butadiene-1,3, 1-bromo-2-methyl butadiene-1,3, 1-bromo-2-methyl butadiene-1,3, 2-iodo-3-methyl butadiene-1,3, 1-fluoro-2-methyl butadiene-1,3, 3-fluoro-butadiene-1,3, 3-bromo-butadiene-1,3, and the like. It is to be understood, of course, that the above compounds represent but a few of the dienes which may be employed in preparing the polymeric materials of this invention, for any of the generic class of conjugated aliphatic dienes may be utilized with good results.

While the vinylidene cyanide is always present in the polymer in substantially 50 mole per cent regardless of the quantity of vinylidene cyanide monomer charged originally, the respective quantities of the dienes which enter into the polymer chain may be varied widely while still obtaining interpolymers which possess useful properties not possessed by two component copolymers of vinylidene cyanide with the dienes. For example, interpolymers containing as little as 2 mole per cent or as much as 45 mole per cent of one of the diene components possess softening points markedly lower than two component copolymers of vinylidene cyanide with dienes and additionally are more soluble in common solvents than are said copolymers. The quantity of the diene components in the polymer chain can be accurately controlled simply by varying the charging ratio of the diene monomers. Accordingly, the amount of any diene entering the polymer chain can be increased by increasing the quantity of that monomer in the polymerization charge. To illustrate, the specific examples hereinbelow show that one of the dienes may be charged in an amount as small as 0.11 mole per cent or as high as 1.1 mole per cent for each mole per cent of vinylidene cyanide. Moreover, both the vinylidene cyanide and the dienes may be charged in amounts other than those shown in the specific examples and the interpolymers obtained will differ in properties from two component copolymers of vinylidene cyanide with the dienes.

It is disclosed in the copending applications referred to hereinabove that vinylidene cyanide reacts quite readily with conjugated dienes to form a Diels-Alder type adduct and that this reaction competes strongly with the polymerization of vinylidene cyanide with the dienes. It is also disclosed in said copending applications that vinylidene cyanide polymerizes ionically in the presence of a number of substances such as water, alcohols, esters, ketones and the like to form a homopolymer which is of low molecular weight (below 25,000) and of little practical value. Accordingly, in preparing the interpolymers of the present invention care must be taken to prevent entirely or reduce to a minimum the two competing side reactions. This is best accomplished by carrying out the polymerization in a single phase system and in the presence of a very active free radical polymerization catalyst. In this manner both the tendency for adduct formation and for ionic homopolymerization of the vinylidene cyanide to occur are greatly repressed and high conversions of monomer to polymer are secured.

A preferred method of carrying out the polymerization consists in first dissolving the monomers in a liquid aromatic hydrocarbon such as benzene and halogenated benzenes, which are especially preferred, toluene, methyl toluene, or the like, desirably in an amount such that the solvent comprises 50 to 80% or more by weight of the total solution. A free radical polymerization catalyst is added to the solution and the resulting mixture heated to a temperature of from −15° C. to 100° C., preferably at 0° C. to 40° C., whereupon polymerization occurs to form the desired interpolymer as a white powder of small particle size, the polymerization requiring approximately 1 to 24 hours in most instances. The interpolymer thus formed may be separated from the polymerization medium simply by filtering, or if desired the polymerization medium can be separated from the polymer and recovered by distillation.

A second method of polymerization, less desirable than the above method, but which may be successfully utilized, consists in agitating the monomers in a liquid aliphatic hydrocarbon (in which vinylidene cyanide monomer is only very slightly soluble), for example, hexane or heptane, and heating in the presence of a free radical polymerization catalyst whereupon the interpolymer forms and may be separated from the polymerization medium by filtering or by other conventional separation means.

The polymerization may also be carried out on a continuous basis simply by adding, continuously or intermittently, fresh quantities of the monomers, and also of catalyst and solvent or diluent, if desired, to the polymerization mixture during the course of the polymerization.

The catalyst utilized in preparing the interpolymers of the present invention are those which form free radicals at the polymerization temperature, and particularly those which are very active free radical type materials, since it is important that the polymerization proceed as rapidly as possible in order that adduct formation between the vinylidene cyanide and the diene cannot take place to an appreciable extent. Particularly useful catalysts of this type include the combination of sulfur dioxide with an organic mercaptan as disclosed in a copending application, Serial No. 346,041, filed March 31, 1953, or the combination of an inorganic acid with an organic thiol (mercaptan) such as methanethiol, 1-butanethiol, toluenethiol and the like, the latter catalyst combination being disclosed in another copending application, Serial No. 346,042, filed March 31, 1953. The combination of sulfur dioxide with a hydroperoxide is also a useful catalyst in the preparation of interpolymers of vinylidene cyanide.

Another class of catalysts useful in preparing interpolymers according to this invention comprises compounds of the structure

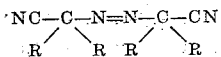

wherein each R is a hydrocarbon radical. Examples of compounds of this class include alpha,alpha'-azodiisobutyronitrile, alpha,alpha'-azobis (alpha,beta-dimethylbutyronitrile), alpha,alpha'-azobis (alpha-cyclopropionitrile), and the like. The use of this type of catalyst in preparing polymers of vinylidene cyanide is disclosed in copending application, Serial No. 288,562, filed May 17, 1952. Diazo compounds other than those which possess the above structure are not useful in the polymerization process as they initiate the ionic homopolymerization of the vinylidene cyanide monomer to the extent that none of the desired interpolymer is obtained.

Other catalysts which are useful in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like.

The amount of catalyst utilized is not critical and may be varied widely. In general, however, from 0.01 to 5% by weight (based on the total weight of monomers charged) of the catalyst is utilized.

The following examples illustrate more fully the preparation of interpolymers of vinylidene cyanide with two or more conjugated aliphatic dienes. The examples are not, however, to be construed as a limitation upon the scope of the invention, for there are, of course, numerous possible variations and modifications in the procedures described. In the examples all parts are by weight.

EXAMPLES I TO VI

A series of tripolymers is prepared by dissolving varying quantities of vinylidene cyanide, butadiene-1,3 and 2-methyl butadiene-1,3 in benzene, adding a mixture of thiophenol and sulfur dioxide in benzene as a polymerization catalyst, and maintaining the resulting mixture at 0° C. for eighteen hours, at the end of which time the vinylidene cyanide charged is substantially all converted to polymer. The monomer charging ratios, quantities of catalyst used, monomer to polymer conversion and softening point of the polymer are recorded in Table I below.

Table I

| Example | I | II | III | IV | V | VI |
|---|---|---|---|---|---|---|
| Mole percent Vinylidene Cyanide Charged | 45 | 45 | 45 | 45 | 45 | 45 |
| Mole percent Butadiene-1,3 Charged | 0 | 15 | 25 | 35 | 45 | 50 |
| Mole percent 2-Methyl Butadiene-1,3 Charged | 55 | 40 | 30 | 20 | 10 | 5 |
| Parts Thiophenol Charged | 0.137 | 0.137 | 0.137 | 0.137 | 0.137 | 0.137 |
| Parts SO₂ Charged | 0.2 | 0.2 | 0.2 | 0.2 | 0.2 | 0.2 |
| Conversion (Based on Vinylidene Cyanide Charged) | 87 | 88.5 | 94 | 94.5 | 98 | 97 |
| Melting Point of Polymer | 185 | 195 | 220 | 241 | 256 | 262 |

All of the tripolymers thus obtained possess very sharp melting points and are crystalline materials. A two component copolymer of vinylidene cyanide with butadiene-1,3 melts at 270° C. It will be noted, therefore, that as the quantity of the third monomer, 2-methyl butadiene-1,3, is increased, the softening point of the resulting tripolymer is proportionately decreased, so that by varying the monomer charging ratios it is possible to obtain a tripolymer having any desired softening point.

EXAMPLES VIII TO XII

Tripolymers of vinylidene cyanide, butadiene-1,3 and piperylene (a mixture of the cis and trans forms) are prepared in benzene solution utilizing a mixture of hydrochloric acid, cumene hydroperoxide and sulfur dioxide as the polymerization catalyst, the temperature being maintained at 20° C. for 25 hours. Thiocresol is added as a chain transfer agent. The pertinent data are recorded in Table II below.

Table II

| Example | VII | VIII | IX | X | XI | XII |
|---|---|---|---|---|---|---|
| Mole percent Vinylidene Cyanide Charged | 45 | 45 | 45 | 45 | 45 | 45 |
| Mole percent Butadiene-1,3 charged | 0 | 15 | 25 | 35 | 45 | 50 |
| Mole percent Piperylene Charged | 55 | 40 | 30 | 20 | 10 | 5 |
| Parts Thiocresol | 0.13 | 0.13 | 0.13 | 0.13 | 0.13 | 0.13 |
| Parts Cumene Hydroperoxide | 0.1 | 0.1 | 0.1 | 0.1 | 0.1 | 0.1 |
| Parts HCl Solution (2% HCl in Benzene) | 3.5 | 3.5 | 3.5 | 3.5 | 3.5 | 3.5 |
| Parts SO₂ Solution (.48% SO₂ in Benzene) | 1.0 | 1.0 | 1.0 | 1.0 | 1.0 | 1.0 |
| Melting Point of Polymer, °C | <110 | 115 | 170 | 210 | 250 | >260 |

From the above data it can again be seen that as the quantity of the third monomer, piperylene in this instance, is increased, the melting point of the polymer is decreased, this property again affording a convenient means for tailoring the polymer to suit any particular need.

EXAMPLES XIII TO XVII

Tripolymers of vinylidene cyanide, butadiene-1,3 and methyl pentadiene-1,3 (a mixture of 2-methyl and 4-methyl pentadiene-1,3; density=0.716) are prepared in benzene solution utilizing a mixture of 0.10 part of cumene hydroperoxide and approximately 0.07 part of hydrochloric acid in benzene as the polymerization catalyst. 0.09 part of p-thiocresol is added as a chain transfer agent and the polymerization mixture is maintained at 0° C. for 24 hours. The monomer charging ratios, polymer melt points and other pertinent data are recorded in Table III below.

Table III

| Example | XIII | XIV | XV | XVI | XVII |
|---|---|---|---|---|---|
| Parts Benzene | 25 | 22 | 20 | 17 | 15 |
| Parts Butadiene-1,3 | 0.57 | 0.96 | 1.33 | 1.72 | 1.92 |
| Parts Methyl Pentadiene-1,3 | 2.3 | 1.7 | 1.15 | 0.57 | 0.32 |
| Parts Vinylidene Cyanide | 2.45 | 2.45 | 2.45 | 2.45 | 2.45 |
| Molar Charging Ratio (Vinylidene cyanide/butadiene-1,3/methyl pentadiene) | 45/15/40 | 45/25/30 | 45/35/20 | 45/45/10 | 45/50/5 |
| Melt Point of Polymer, °C | 130–160 | 220–250 | 260 | 266 | 269 |

EXAMPLES XVIII TO XXI

Tripolymers of vinylidene cyanide, butadiene-1,3 and 2,3-dimethyl butadiene-1,3 are prepared according to the method of Examples XIII to XVII. The pertinent data are recorded in Table IV below:

Table IV

| Example | XVIII | XIX | XX | XXI |
|---|---|---|---|---|
| Parts Benzene | 29 | 22 | 19 | 17 |
| Parts Butadiene-1,3 | 0.0 | 0.96 | 1.33 | 1.72 |
| Parts 2,3-Dimethyl Butadiene-1,3 | 3.2 | 1.76 | 1.16 | 0.59 |
| Parts Vinylidene Cyanide | 2.4 | 2.4 | 2.4 | 2.4 |
| Molar Charging Ratio (Vinylidene cyanide/butadiene-1,3/2,3-dimethyl butadiene-1,3) | 45/0/55 | 45/25/30 | 45/35/20 | 45/45/10 |
| Melt Point of Polymer, °C | 302 | 220 | 238 | 255 |

Also, when the above examples are repeated substituting other of the dienes disclosed hereinabove for those of the examples, interpolymers are obtained which are substantially equivalent to those of the specific examples.

From the foregoing description of the invention it will be seen that the interpolymers of the present invention constitute a new and useful class of polymeric materials.

We claim:
1. An interpolymer comprising vinylidene cyanide copolymerized with two conjugated aliphatic dienes, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

2. An interpolymer comprising vinylidene cyanide copolymerized with two conjugated aliphatic dienes, one of which is butadiene-1,3, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

3. A tripolymer of vinylidene cyanide, butadiene-1,3 and methyl pentadiene, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homoploymerization reaction to give a solid water-insoluble resin, said interpolymer containing substantially 50 mole per cent copolymerized vinylidene cyanide.

4. A tripolymer of vinylidene cyanide, butadiene-1,3 and 2,3-dimethyl butadiene-1,3, the vinylidene cyanide component being derived from monomeric vinylidene cyanide which is a crystalline solid at 0° C., having a melting point when in purest form of substantially 9.0° to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

5. A tripolymer of vinylidene cyanide, butadiene-1,3 and 2-methyl butadiene-1,3, the vinylidene cyanide component being derived from monomeric vinylidene cyanide which is a crystalline solid at 0° C., having a melting point when in purest form of substantially 9.0° to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

6. A tripolymer of vinylidene cyanide, butadiene-1,3 and piperylene, the vinylidene cyanide component being derived from monomeric vinylidene cyanide which is a crystalline solid at 0° C., having a melting point when in purest form of substantially 9.0° to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

7. The method which comprises dissolving vinylidene cyanide which is a liquid at room temperature and a crystalline solid at 0° C., having a melting point when in purest form of substantially 9.0° to 9.7° C., and is characterized chemically by the ability to undergo on contact with water at room temperature an instantaneous homopolymerization reaction to give a solid water-insoluble resin, and two conjugated aliphatic dienes in a liquid aromatic hydrocarbon and adding a polymerization catalyst whereupon polymerization occurs to form an interpolymer of vinylidene cyanide with said conjugated aliphatic dienes, said interpolymer containing substantially 50 mole per cent copolymerized vinylidene cyanide.

8. The method which comprises dissolving vinylidene cyanide which is a liquid at room temperature and a crystalline solid at 0° C., having a melting point when in purest form of substantially 9.0° to 9.7° C., and is characterized chemically by the ability to undergo on contact with water at room temperature an instantaneous homopolymerization reaction to give a solid water-insoluble resin, butadiene-1,3, and another conjugated aliphatic diene in a liquid aromatic hydrocarbon and adding a polymerization catalyst whereupon polymerization occurs to form an interpolymer of vinylidene cyanide with said butadiene-1,3 and conjugated aliphatic diene, said interpolymer containing substantially 50 mole per cent copolymerized vinylidene cyanide.

9. The method of claim 8 wherein the liquid aromatic hydrocarbon is benzene.

10. The method of claim 8 wherein the conjugated aliphatic diene is 2-methyl butadiene-1,3.

11. The method of claim 8 wherein the conjugated aliphatic diene is piperylene.

12. The method of claim 8 wherein the conjugated aliphatic diene is methyl pentadiene.

13. The method of claim 8 wherein the conjugated aliphatic diene is 2,3-dimethyl butadiene-1,3.

References Cited in the file of this patent

UNITED STATES PATENTS 2,466,395    Dickey _____ Apr. 5, 1949